3,454,612
STABILIZATION OF ORGANOLEAD COMPOUNDS
Walter E. Foster and John K. Presswood, Baton Rouge,
La., assignors to Ethyl Corporation, New York, N.Y.,
a corporation of Virginia
No Drawing. Filed June 19, 1967, Ser. No. 647,233
Int. Cl. C07f 7/24
U.S. Cl. 260—437                                    6 Claims

ABSTRACT OF THE DISCLOSURE

This invention relates to a process for stabilizing organolead compounds against thermal decomposition by the use of Raney nickel, nickel oxide or mixtures thereof as stabilizing agents.

Background of the invention

Organolead compounds, particularly tetraethyllead and tetramethyllead, are well known organometallics highly effective as antiknock additives for hydrocarbon fuels for internal combustion engines. These valuable chemicals may be synthesized by many processes, one of which is the reaction of an alloy of lead and an alkali metal, especially sodium, with an alkyl halide, the alkyl group thereof being that which is desired for attachment in the tetraalkyllead compound. As an illustration, such a reaction for the synthesis of tetramethyllead is represented by the equation.

$$4NaPb + 4CH_3Cl \rightarrow (CH_3)_4Pb + 4NaCl + 3Pb$$

Yields in the order of 80–90 percent are usually achieved in commercial processes utilizing the foregoing reaction.

It is well known in the art that organolead compounds, particularly tetraalkyllead compounds, are generally thermally unstable. In view of the wide and varied use of such compounds in industry, problems associated with thermal decomposition of these compounds frequently become acute. For example, in the production of many organoleads by processes such as that described above, the reaction frequently occurs at elevated temperatures. Since several hours are usually required for the desired reaction to take place in these processes, ample time is afforded for the product organolead to decompose thermally while still in the reaction system. It is also well known in the art that organolead compounds may have a tendency to decompose thermally during storage or shipment where heat or agitation in a closed container may cause the composition temperature to rise. It is obvious that any number of additional industrial uses of organolead compounds can give rise to the problem of thermal decomposition either when the compounds are used directly or as valuable chemical intermediates. In the absence of suitable techniques for thermally stabilizing organolead compounds significant losses of these compositions may be expected to occur from exposure to elevated temperatures; therefore, provision of a process for thermally stabilizing organolead compounds would be a welcomed contribution to the art.

Summary of the invention

In accordance with this invention, there is provided a process for stabilizing an organolead compound against thermal decomposition which comprises maintaining the organolead compound in contact with at least one of the group of stabilizing agents consisting of Raney nickel, nickel oxide and mixtures thereof and the thermally stabilized composition thus produced.

Description of the preferred embodiments

A preferred embodiment of this invention provides a process for thermally stabilizing an organolead compound under a wide range of temperatures, pressures and stabilizer concentrations. The temperature range may vary from about 20° C. to about 120° C. and rapid changes in temperature which may be associated with organolead synthesis reactions have substantially no adverse result on the effectiveness of the Raney nickel, nickel oxide, or mixtures of both to prevent thermal decomposition of the organolead in the reaction mixture. Pressure variations likewise cause substantially no reduction in stabilizer effectiveness, and the stabilizing agents may be used in reaction systems subjected to pressures ranging from about atmospheric or less to about 13,000 p.s.i.g. Further, stabilizing agent concentrations have been varied from about 2 to about 60 weight percent based on the weight of an organolead product in the reaction systems with no observable decrease in stabilizer effectiveness in preventing thermal decomposition of an organolead compound.

The invention embodies a thermal stabilizing process which is not dependent upon stabilizer particle size or the particular method used for its introduction into the reaction system. For example, the particle size may vary from a Tyler standard sieve of 400 mesh to 1.05 inches without substantially altering the effectiveness of the stabilizer. Particles both smaller and larger may be used also when convenient.

An obvious advantage may be realized by use of commercial grade Raney nickel and nickel oxide particles which may be introduced by conventional techniques into contact with the organolead to be stabilized. This flexibility of use in the invention is further expanded by the need for only one of the two stabilizers to be in contact with the organolead for stabilization to take place and by the fact that both stabilizers are effective regardless of the presence of impurities which may be in the reaction mixture. In addition, the process of stabilization is not dependent upon the particular method by which the organolead compound is produced so long as the stabilizer is in contact with this compound.

A further preferred embodiment of this invention is a thermally stabilized organolead composition comprising an organolead compound and a thermal stabilizer selected from the group consisting of Raney nickel, nickel oxide and mixtures thereof. The composition of the invention offers advantage because of the surprising thermal stabilization of organolead compositions over a long period of time and under a variety of conditions not limited to the time or the reaction conditions of organolead synthesis.

A further advantage is found in the fact that the thermal stabilizer may be removed from the organolead compound in a simple and easy manner if desired or necessary for subsequent use of the organolead compound. The thermal stabilizer may be removed by filtration, decantation or any other well known means in a convenient manner since the stabilizer is a solid and the organolead compound is liquid and the thermal stabilizer remains a solid in use.

The ramifications of this feature of the invention appear to be obvious; the composition may be stabilized against thermal decomposition throughout the entire synthesis process, during storage of the product composition, and at all other times until ultimate use by a consumer, without the need for addition of other components to achieve the same result. A further advantage is therefore offered in eliminating the need for adding costly thermal stabilizing agents after the composition of the invention is removed from a commercial production area for storage or transport.

The process of this invention is applicable to the thermal stabilization of organolead compounds in general; however, specific examples based on experiments in which Raney nickel and nickel oxide were used in alternative runs to thermally stabilize tetraethyllead are illustrative of the applicability of the invention.

EXAMPLE I

A 1 liter Parr autoclave was charged in a nitrogen box with the reaction mass from a multiple autoclave containing 30 grams of lead, 13.9 grams of tetraethyllead (TEL) and 11 grams of NaCl together with 1.0 gram of Raney nickel particles and 260 ml. of isooctane solvent to permit stirring. The Parr autoclave was then sealed, purged with ethylene, and pressured to 605 p.s.i.g. with ethylene and hydrogen in a molar ratio between 1:1 and 2:1. The pressured outoclave was then heated with stirring for several hours at 120° C. and after cooling was vented and the contents analyzed for TEL. The percentage of TEL decomposed was found to be 10.5 percent.

EXAMPLE II

A 100 ml. Magnedash autoclave was charged in a nitrogen box with 3.8 grams of TEL, 8.2 grams of lead, and 3.0 grams of sodium chloride, together with 2.0 grams of nickel oxide particles and 15 ml. of isooctane solvent. The autoclave was sealed, purged as in Example I, and pressured to 4425 p.s.i.g. with ethylene and hydrogen in a molar ratio between 1:1 and 2:1. The autoclave was heated to a temperature of 105° C. and its contents stirred for several hours. After cooling it was vented and the TEL contents were analyzed. The amount of TEL decomposed was found to be 3 percent.

EXAMPLE III

Reaction components, conditions and equivalent were the same as those in Example II, except that 0.5 gram of Raney nickel particles were used as a thermal stabilizer instead of nickel oxide. The percentage of TEL found to be decomposed was 6 percent.

EXAMPLE IV

A 100 ml. Magnedash autoclave was charged with 3.8 grams of TEL, 8.2 grams of lead, and 3.0 grams of NaCl, together with 1.0 gram of nickel oxide particles and 15 ml. of isooctane solvent. The autoclave was sealed, purged as in Example I, and pressured in with ethylene and hydrogen in a molar ratio between 1:1 and 2:1. The autoclave was heated to a temperature of 105° C., its contents stirred for several hours, and it was then vented after cooling. The decomposition of TEL was found to be 11.0 percent.

EXAMPLE V

Reaction components, conditions and equipment were the same as those in Example IV, except that 0.5 gram of Raney nickel particles was used as a thermal stabilizer instead of nickel oxide, and the reaction temperature was maintained at 100° C. The amount of TEL decomposed was found to be 8.0 percent.

EXAMPLE VI

Reaction components, conditions and equipment were the same as those in Example IV except that no thermal stabilizer was used, the reaction temperature was maintained at 80° C., and the pressure was set at 5250 p.s.i.g. TEL decomposition was calculated to be 39.0 percent.

EXAMPLE VII

Reaction components, conditions and equipment were the same as those in Example VI except that the reaction temperature was maintained at 93° C. and the pressure at 10,300 p.s.i.g. TEL decomposition was noted to be 32.0 percent.

The data of Examples I–VII are summarized below in table.

TABLE

| Example | Stabilizer | Stab. wt. (grams) | Temp. (° C.) | Pr. (p.s.i.g.) | Percent TEL decomposed |
|---|---|---|---|---|---|
| I | Raney nickel | 1.0 | 120 | 605 | 10.5 |
| II | Nickel oxide | 2.0 | 105 | 4,425 | 3.0 |
| III | Raney nickel | 0.5 | 105 | 3,425 | 6.0 |
| IV | Nickel oxide | 1.0 | 105 | 10,000 | 11.0 |
| V | Raney nickel | 0.5 | 100 | 12,775 | 8.0 |
| VI | None | | 80 | 5,250 | 39.0 |
| VII | do | | 93 | 10,300 | 32.0 |

By comparison of Examples VI and VII with Examples I–V in table, the thermal stabilization of organolead compounds in accordance with this invention is clear. The percentage of tetraethyllead decomposed in Examples VI and VII was found to be 39% and 32%, respectively, or an average of 35.5%, when no thermal stabilizer was added to the reaction mixture. In comparison, the average amount of tetraethyllead decomposed in Examples I–V was only 7.7% when either Raney nickel or nickel oxide particles were introduced into the system as a thermal stabilizer. As these examples point out clearly, significant thermal stabilization of organolead compounds is achieved by application of this invention.

Typically, the invention is useful in the thermal stabilization of tetraethyllead compositions in tetraethyllead synthesis processes while the tetraethyllead remains in the reaction mixture; however, the process may easily be adopted to the thermal stabilization of essentially all organolead compounds in a multiplicity of industrial applications such as storage and transportation operations.

As evidenced by the above disclosures, this invention will greatly reduce costly organolead losses occurring as a result of thermal decomposition and in so doing, will represent a significant contribution to the existing art.

What is claimed is:

1. A process for stabilizing an alkyllead compound against thermal decomposition which comprises maintaining the alkyllead compound in contact with from about 2 to about 60 weight percent based on the weight of the alkyllead compound of at least one of the group of stabilizing agents consisting of Raney nickel, nickel oxide and mixtures thereof.

2. The process of claim 1 further characterized by the alkyllead compound being tetraethyllead.

3. The process of claim 1 further characterized by contacting the alkyllead compound and said at least one of the group of stabilizing agents at a pressure from about atmospheric to about 13,000 p.s.i.g. and a temperature of from about 20° C. to about 120° C.

4. A thermally stabilized organolead composition comprising an alkyllead compound and at least one stabilizing agent in contact therewith selected from the group consisting of Raney nickel, nickel oxide and mixtures thereof, said at least one stabilizing agent being present in a concentration of from about 2 to about 60 weight percent based on the weight of the alkyllead compound.

5. The organolead composition of claim 4 further characterized by said alkyllead compound being tetraethyllead.

6. The process of claim 1 further characterized by said at least one of the group of stabilizing agents being nickel oxide.

References Cited

UNITED STATES PATENTS 3,136,795 6/1964 Blitzer et al. _____ 260—437
3,312,726 4/1967 Cook.
3,340,284 9/1967 Cook et al.

TOBIAS E. LEVOW, *Primary Examiner.*

H. M. S. SNEED, *Assistant Examiner.*

U.S. Cl. X.R.

252—386